United States Patent
Buer et al.

(10) Patent No.: US 8,233,889 B2
(45) Date of Patent: Jul. 31, 2012

(54) METHOD AND SYSTEM FOR A PERSISTENT REQUEST GENERATED BY A WIRELESS DEVICE, EXECUTED REMOTELY AND OUTPUT TO CONFIGURABLE LOCAL RESOURCES

(75) Inventors: Mark Buer, Gilbert, AZ (US); Arya Behzad, Poway, CA (US); Jeyhan Karaoguz, Irvine, CA (US); Alexander MacInnis, Ann Arbor, MI (US); Thomas Quigley, Franklin, NC (US); John Walley, Ladera Ranch, CA (US)

(73) Assignee: Broadcom Corporation, Irvine, CA (US)

( * ) Notice: Subject to any disclaimer, the term of this patent is extended or adjusted under 35 U.S.C. 154(b) by 804 days.

(21) Appl. No.: 11/865,805

(22) Filed: Oct. 2, 2007

(65) Prior Publication Data

US 2009/0022119 A1    Jan. 22, 2009

Related U.S. Application Data

(60) Provisional application No. 60/951,033, filed on Jul. 20, 2007.

(51) Int. Cl.
*H04L 29/06* (2006.01)
*H04M 3/00* (2006.01)
*H04M 1/66* (2006.01)
*H04M 3/42* (2006.01)

(52) U.S. Cl. .............. 455/414.3; 455/410; 455/414.1; 455/419

(58) Field of Classification Search ............. 455/414.1, 455/414.2, 414.3, 414.4, 418, 419, 420, 410; 380/247

See application file for complete search history.

(56) References Cited

U.S. PATENT DOCUMENTS

| | | | | |
|---|---|---|---|---|
| 7,877,776 | B2 * | 1/2011 | Krikorian et al. | 725/95 |
| 2002/0058521 | A1 * | 5/2002 | Yamada et al. | 455/458 |
| 2003/0050050 | A1 * | 3/2003 | Higuchi et al. | 455/414 |
| 2008/0254785 | A1 * | 10/2008 | Lazaridis et al. | 455/419 |

OTHER PUBLICATIONS

Seagate Technology LLC, Seagate D.A.V.E. (Digital Audio Video Experience) Transform the consumer experience with the Seagate D.A.V.E. design concept, Data Sheet 2007.

Seagate Technology LLC, Seagate D.A.V.E. (Digital Audio Video Experience) The portable storage platofrm that collects, plays and manages digital content, Product Overview, 2007.

* cited by examiner

*Primary Examiner* — Un C Cho

(74) *Attorney, Agent, or Firm* — Thomas, Kayden, Horstemeyer & Risley, LLP

(57) ABSTRACT

Methods and systems for a persistent request generated by a wireless device, executed remotely and output to configurable local resources are disclosed and may include generating via a handheld wireless communication device (HWCD) a persistent request for a user that may be communicated to remote devices for execution and storage of results. The stored results may be received from local resources local which may be configured by the remote devices based on user preferences to deliver the stored results to the user. The stored results may be received by the user via the HWCD or another wireless communication device, and the identity of the user may be authenticated prior to receiving the stored results. The remote devices may discover the local resources based on the detection of the user logging into the network. User preferences may be stored in networked devices or may be stored in the HWCD.

18 Claims, 5 Drawing Sheets

METHOD AND SYSTEM FOR A PERSISTENT REQUEST GENERATED BY A WIRELESS DEVICE, EXECUTED REMOTELY AND OUTPUT TO CONFIGURABLE LOCAL RESOURCES

CROSS-REFERENCE TO RELATED APPLICATIONS/INCORPORATION BY REFERENCE

This application makes reference to and claims priority to U.S. Provisional Application Ser. No. 60/951,033, filed on Jul. 20, 2007, which is incorporated herein by reference in its entirety.

FEDERALLY SPONSORED RESEARCH OR DEVELOPMENT

[Not Applicable]

MICROFICHE/COPYRIGHT REFERENCE

[Not Applicable]

FIELD OF THE INVENTION

Certain embodiments of the invention relate to wireless communication. More specifically, certain embodiments of the invention relate to a method and system for a persistent request generated by a wireless device, executed remotely and output to configurable local resources.

BACKGROUND OF THE INVENTION

The field of wireless communication has seen dramatic growth the last few years. In today's world, most people use their wireless devices, be it cellular phones, PDA's, laptops, and/or other devices, for various purposes, business and personal, on a constant and daily basis. Society is truly becoming a wireless one. Many wireless solutions have been introduced, and have made tremendous strides into everyday life.

For example, the use of Wireless Personal Area Networks (WPAN) has been gaining popularity in a great number of applications because of the flexibility and convenience in connectivity they provide. WPAN systems generally replace cumbersome cabling and/or wiring used to connect peripheral devices and/or mobile terminals by providing short distance wireless links that allow connectivity within very narrow spatial limits (typically, a 10-meter range). WPAN may be based on standardized technologies, for example Class 2 Bluetooth (BT) technology. While WPAN may be very beneficial for certain applications, other applications may require larger service areas and/or capabilities.

To satisfy such needs, other technologies have been developed to provide greater wireless service. Wireless Local Area Networks (WLAN) systems may operate within a 100-meter range, for example. In contrast to the WPAN systems, WLAN provide connectivity to devices that are located within a slightly larger geographical area, such as the area covered by a building or a campus, for example. WLAN systems are generally based on specific standards, for example IEEE 802.11 standard specifications, and typically operate within a 100-meter range, and are generally utilized to supplement the communication capacity provided by traditional wired Local Area Networks (LANs) installed in the same geographic area as the WLAN system.

Other forms of wireless solutions have evolved from traditional land-based communication technologies. For instance, cellular phones have become just about an absolute necessity in today's world. While cellular technology was merely intended to add an element of mobility to the traditional telephony service, this technology has grown beyond that initial purpose. Many modern cellular technologies, including such technologies as GSM/GPRS, UMTS, and CDMA2000 may incorporate substantial data capabilities. Most of today's cellular services may include such features as text messaging, video streaming, web browsing . . . etc.

Some mobile devices have the capability to utilize one or more wireless technologies. For instance, WLAN systems may be operated in conjunction with WPAN systems to provide users with an enhanced overall functionality. For example, Bluetooth technology may be utilized to connect a laptop computer or a handheld wireless terminal to a peripheral device, such as a keyboard, mouse, headphone, and/or printer, while the laptop computer or the handheld wireless terminal may also be connected to a campus-wide WLAN network through an access point (AP) located within the building. Also, cellular technology may allow use of the mobile phone as a form of wireless modem that allows connecting a laptop, for example, to the internet via a cellular network.

Just as with other electronic devices, wireless communication devices have seen substantial growth in performance capability and speed. As such, they are finding applications in areas not predicted when first introduced to give users mobile telephony. They may comprise mini computers, multimedia players, GPS devices and many other applications, for example.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for communicating within a network, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain aspects of the invention may be found in a method and system for a persistent request generated by a wireless device, executed remotely and output to configurable local resources. Exemplary aspects of the invention may comprise generating for a particular user via a handheld wireless communication device (HWCD), a persistent request that may be communicated to one or more remote devices for execution and storage of results corresponding to the persistent request. The stored results may be subsequently received from one or more resources local to the particular user. The remote devices may configure local resources to deliver the stored results to the particular user. The stored results may be received by the particular user via the HWCD, and the identity of the particular user may be authenticated prior to receiving the stored results via the HWCD. The stored results for the particular user may be received via another wireless communication device following user authentication. The remote devices may detect when the particular user may be logged into the network and may discover the local resources based on the detection of the particular user logging into the network. The remote devices may configure the local resources to deliver the stored results to the particular user based on the discovery of local resources. The remote devices may configure the local resources based on preferences associated with the particular user. Preferences associated with the particular user may be stored in one or more devices that may be communicatively coupled to the network, or may be stored in the HWCD.

Figure 1:
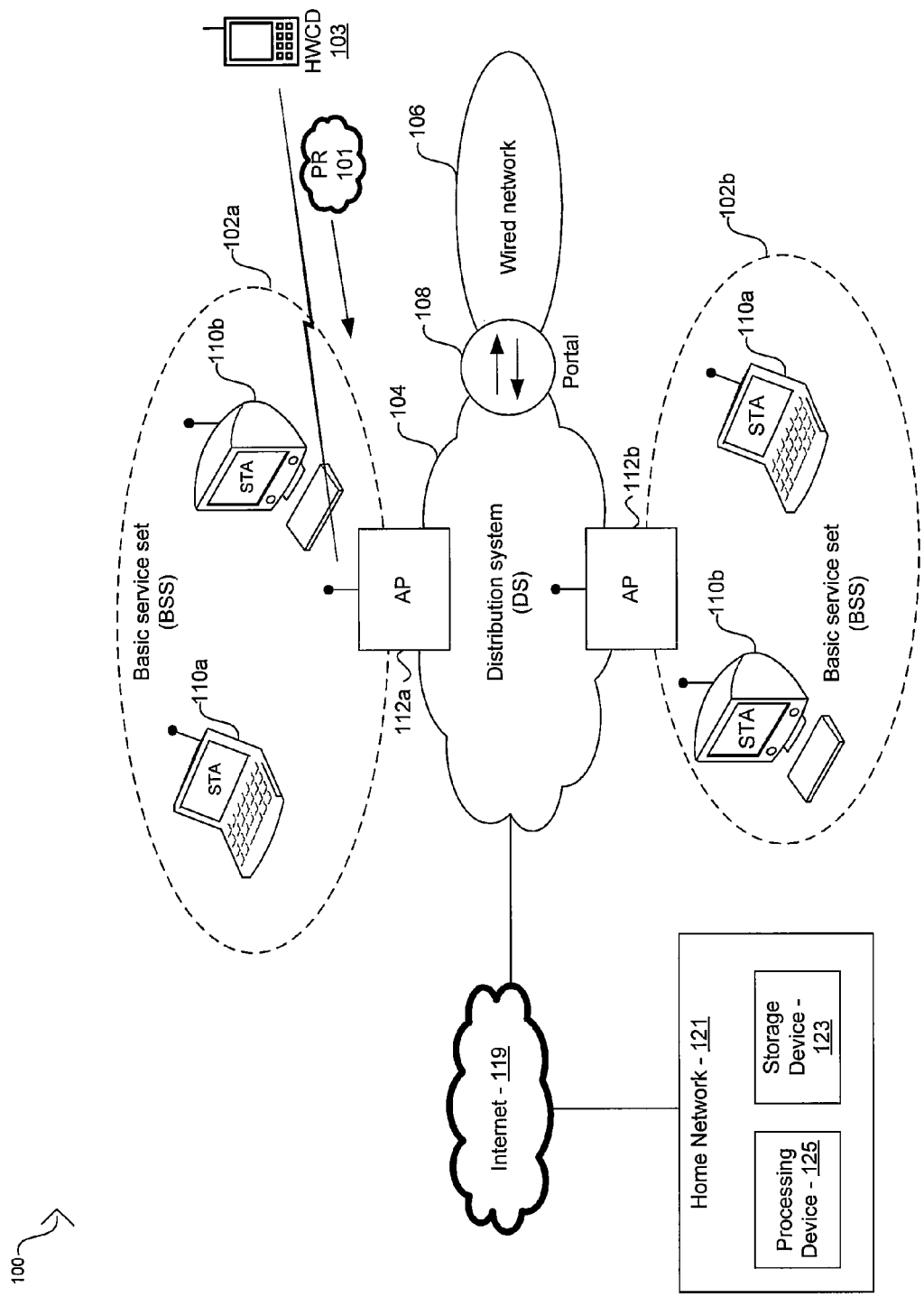
FIG. 1 is a block diagram of an exemplary WLAN infrastructure network comprising basic service sets (BSSs) integrated using a common distribution system (DS), in accordance with an embodiment of the invention.

FIG. 1 is a block diagram of an exemplary WLAN infrastructure network comprising basic service sets (BSSs) integrated using a common distribution system (DS), in accordance with an embodiment of the invention. Referring to FIG. 1, the exemplary WLAN infrastructure network 100 shown may comprise a handheld wireless communication device (HWCD) 103, a first BSS 102a, a second BSS 102b, a DS 104, a wired network 106, a portal 108, a first access point (AP) 112a, a second AP 112b, a home network 121, the Internet 119 and a plurality of WLAN stations 110a and 110b.

The HWCD 103 may comprise suitable circuitry, logic and/or code that may be enabled to provide wireless communication between a user and networked resources. In an exemplary embodiment of the invention, the HWCD 103 may comprise a cellular phone that may be capable of communicating utilizing multiple wireless protocols such as cellular, WLAN, WiMax, Bluetooth, RFID and NFC, for example.

The BSSs 102a and 102b may represent a fundamental building block of the IEEE 802.11 (WLAN) architecture and may be defined as a group of stations that are under the direct control of a single coordination function. The geographical area covered by a BSS is known as the basic service area (BSA). The DS 104 may be utilized to integrate the BSSs 102a and 102b and may comprise suitable hardware, logic, circuitry and/or code that may be adapted to operate as a backbone network that is responsible for Medium Access Control (MAC) level transport in the WLAN infrastructure network 100. The DS 104, as specified by the IEEE 802.11 standard, may be implementation independent. For example, the DS 104 may be implemented utilizing IEEE 802.3 Ethernet Local Area Network (LAN), IEEE 802.4 token bus LAN, IEEE 802.5 token ring LAN, Fiber Distributed Data Interface (FDDI) Metropolitan Area Network (MAN), or another IEEE 802.11 wireless medium. The DS 104 may be implemented utilizing the same physical medium as either the first BSS 102a or the second BSS 102b. However, the DS 104 may be logically different from the BSSs and may be utilized only to transfer packets between the BSSs and/or to transfer packets between the BSSs and the wired network 106.

The wired network 106 may comprise suitable hardware, logic, circuitry, and/or code that may be adapted to provide wired networking operations. The wired network 106 may be accessed from the WLAN infrastructure network 100 via the portal 108. The portal 108 may comprise suitable hardware, logic, circuitry, and/or code and may be adapted to integrate the WLAN infrastructure network 100 with non-IEEE 802.11 networks. Moreover, the portal 108 may also be adapted to perform the functional operations of a bridge, such as range extension and/or translation between different frame formats, in order to integrate the WLAN infrastructure network 100 with IEEE 802.11-based networks.

The APs 112a and 112b may comprise suitable hardware, logic, circuitry and/or code that may be adapted to support range extension of the WLAN infrastructure network 100 by providing the integration points necessary for network connectivity between the BSSs. The WLAN stations 110a and 110b correspond to WLAN-enabled terminals that comprise suitable hardware, logic, circuitry and/or code that may be adapted to provide connectivity to the WLAN infrastructure network 100 via the APs. The WLAN station 110a shown is a laptop computer and may correspond to a mobile station or terminal within the BSS and the WLAN station 110b shown is a desktop computer and may correspond to a fixed or stationary terminal within the BSS. Each BSS may comprise a plurality of mobile or fixed stations and may not be limited to the exemplary implementation shown in FIG. 1.

The home network 121 may comprise a HWCD user's home network, and may comprise storage and processing devices, such as the storage device 123 and the processing device 125. The processing device 125 may enable execution of a persistent request 101 without excessive utilization of the processing and wireless communication resources of the HWCD 103. Data such as multimedia content that a user may wish to access from remote networks or resources at a later time, such as when the user may again be within range of a wireless network, may be stored on the storage device 123 in the home network 121.

In operation, a user of the handheld wireless communication device (HWCD) 103 may wish to utilize resources from within a BSS to communicate a persistent request 101 from the HWCD 103 to a home network via the AP 112a in the BSS 102a with the purpose of obtaining multimedia data on an event of interest, for example. The HWCD 103 may be capable of communicating with a local network via a plurality of wireless protocols. Multimedia content may comprise programming that a user may have requested but may not be available until a later time, or may be retrieved at a later time when the user may again be in communication with the network on which the data may be stored.

The persistent request 101 generated by the HWCD 103 may be stored on the storage device 123 or the processing device 125, for example, and may comprise a request for information over a period of time, and/or data on an event that may occur over a period of time. Since the HWCD 103 may change locations over time, the persistent request 101 may be stored on the processing device 125 so that it may continue to retrieve information and store it on the storage device 123, which may comprise a digital video recorder, for example. In an exemplary embodiment, a user may wish to watch, listen to, and/or keep apprised of a sporting event, not only the score of the event, but also multimedia data of the event, including audio and video, for example, depending on the resources encountered by the user and/or preferences pre-defined by the user. The persistent request 101 may enable the storage device 123 to record the video broadcast of the sporting event. User preferences may be stored locally on the HWCD 103 or remotely on the home network 121, on the storage device 123, for example.

As the HWCD 103 moves to different locations, leaving BSS 102a and entering BSS 102b, for example, the persistent request 101 may enable communication of retrieved information to the HWCD 103 or to resources local to the HWCD 103. The HWCD 103 may comprise global positioning satellite (GPS) capability to indicate to the persistent request 101 on the processing device 125 the location of the HWCD 103. The HWCD 103 may auto-discover, or poll for available resources and communicate pertinent data regarding the discovered resources to the persistent request 101. In this manner, the persistent request 101 may enable appropriate resources to display and/or playback data retrieved on the sporting event for the user of the HWCD 103.

In another embodiment of the invention, if the user preferences specify a particular format and/or capability in the resources to be used to display and/or output the results of the persistent request 101, and no resources with these formats and/or capabilities are available, the desired data may be communicated to the HWCD 103 at a later time when the resources may be present. For example, if the desired multimedia data comprises high definition television programming, the user preferences may dictate that the programming not be retrieved and displayed until an appropriate display may be available.

In an embodiment of the invention, the identity of the user of the HWCD 103 may be authenticated to deny unauthorized access to user data. The number of HWCDs is not limited to the HWCD 103 shown in FIG. 1. Accordingly, any number of wireless devices that may be accessed by the user may be utilized for receiving results of the persistent request 101.

Figure 2:
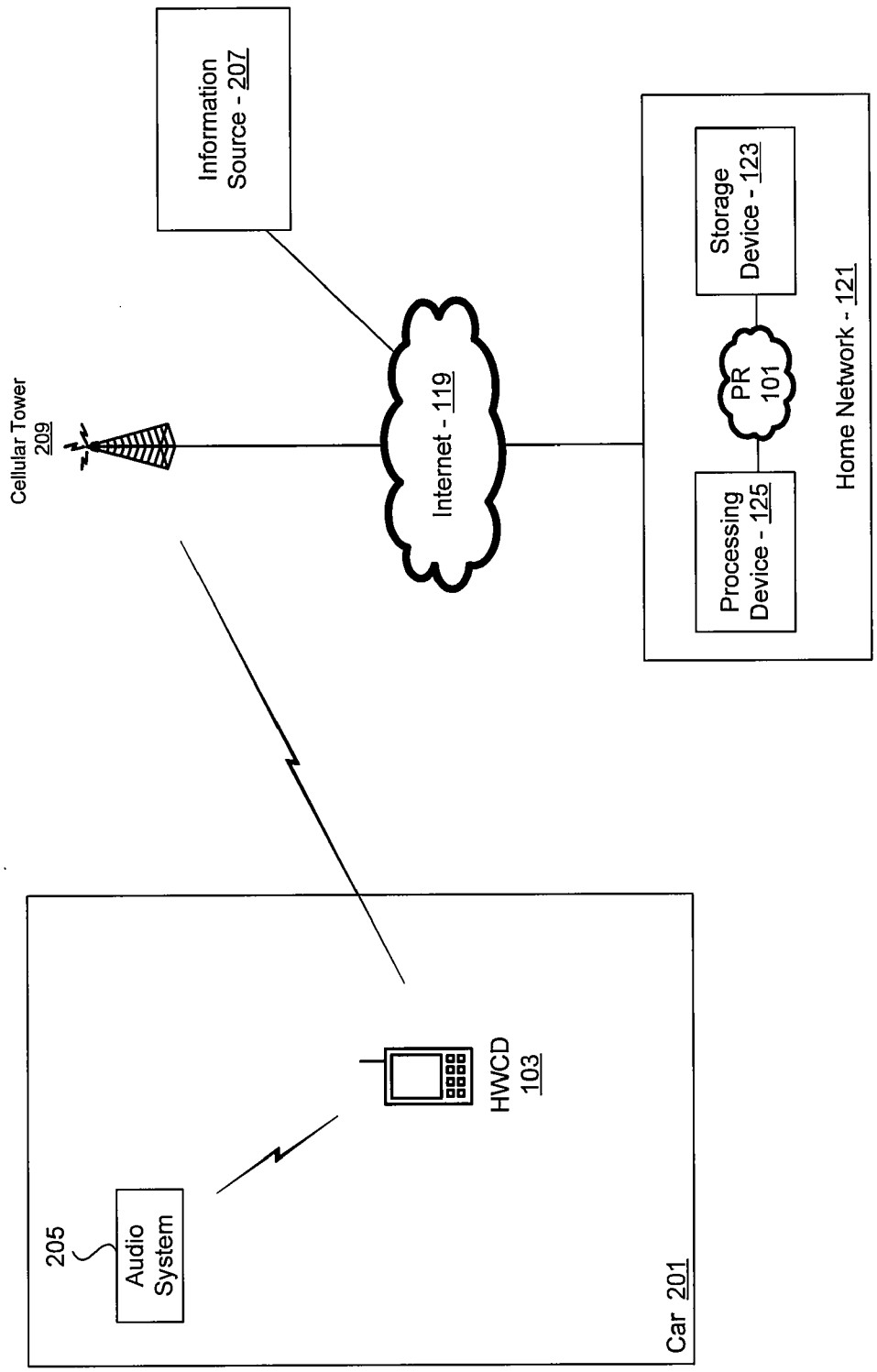
FIG. 2 is an exemplary persistent request implementation, in accordance with an embodiment of the invention.

FIG. 2 is an exemplary persistent request implementation, in accordance with an embodiment of the invention. Referring to FIG. 2, there is shown a car 201, a cellular tower 209, an information source 207, the Internet 119 and the home network 121 comprising the storage device 123, the processing device 125 and the persistent request 101 generated by the HWCD 103. The HWCD 103, the processing device 125, the persistent request 101 and the storage device 123 may be as described with respect to FIG. 1. The car may comprise the audio system 205, which may enable playback of audio from received radio signals and local storage media, such as compact discs, for example. The information source 207 may comprise one or more websites, for example, that may provide information on the object of the persistent request 101, such as a sporting event, for example.

In an exemplary of the invention, in instances where the persistent request 101 may be generated by the HWCD 103 and communicated to a remote device, such as the processing device 125 and/or the storage device 123, to monitor and store data on a sporting event, as described with respect to FIG. 1, a user of the HWCD 103 may subsequently enter a car 201, such as a taxi cab, for example. In instances where the sporting event is being broadcast by radio, the persistent request 101 may enable the audio system 205 to tune to the radio station broadcasting the sporting event either by communicating via the Internet 119 and the cellular tower 209 or by the HWCD 103 via the Internet 119 and the cellular tower 209. The persistent request 101 may enable determining the appropriate radio station utilizing the information source 207. The HWCD 103 may be GPS capable to indicate to the persistent request 101 the location of the HWCD 103. In another embodiment of the invention, the HWCD 103 may also store the persistent request 101 locally, such that the HWCD 103 may enable resources, such as the audio system 205, independently of the remote processing device 125.

As described with respect to FIG. 1, if the user preferences specify a particular format and/or capability in the resources to be used to display and/or output the results of the persistent request 101, and no resources with these formats and/or capabilities are available, the desired data may be communicated to the HWCD 103 at a later time when the resources may be present.

In an embodiment of the invention, the identity of the user of the HWCD 103 may be authenticated to deny unauthorized access to user data. The number of HWCDs is not limited to the HWCD 103 shown in FIG. 2. Accordingly, any number of wireless devices that may be accessed by the user may be utilized for receiving results of the persistent request 101.

Figure 3:
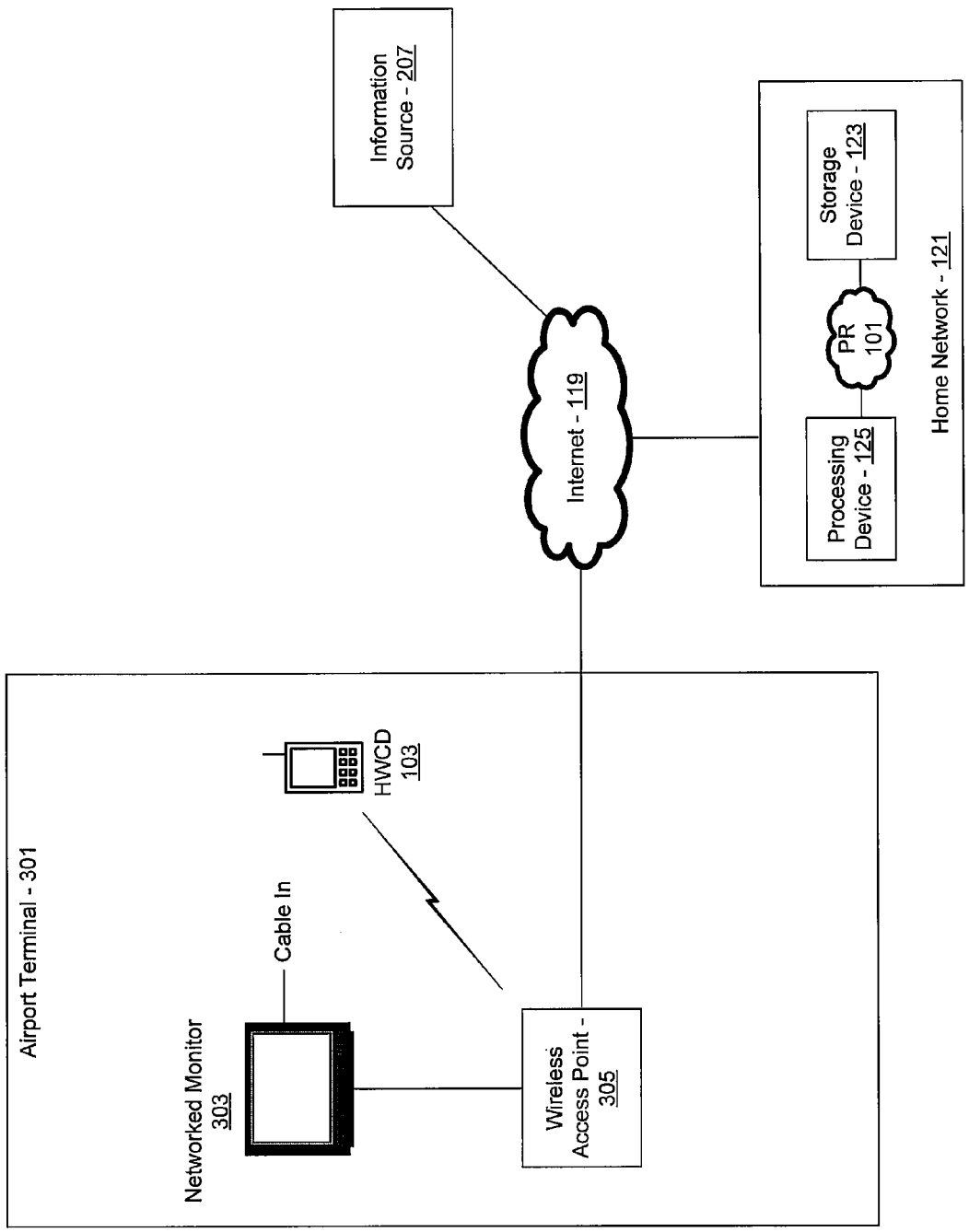
FIG. 3 is an exemplary persistent request airport terminal implementation, in accordance with an embodiment of the invention.

FIG. 3 is an exemplary persistent request 101 airport terminal implementation, in accordance with an embodiment of the invention. Referring to FIG. 3, there is shown an airport terminal 301, the Internet 119, the home network 121 and the information source 207. The home network 121 and the information source 207 may be as described with respect to FIG. 2. The airport terminal 301 may comprise a networked monitor 303 and a wireless access point 305. The networked monitor 303 may be enabled to display multimedia data received from the wireless access point 305 or from a cable input connection from a cable TV provider, for example. The access point 305 may comprise suitable circuitry, logic and/or code that may enable wireless communication between wireless devices, such as the HWCD 103 and a local network and/or the Internet 119.

In an exemplary operation, in instances where a persistent request 101 may be generated by the HWCD 103 and communicated to a remote device, such as the processing device 125 and/or the storage device 123, to monitor and store data on a sporting event, as described with respect to FIG. 1, a user of the HWCD 103 may enter the airport terminal 301. In instances where the sporting event to be monitored by the persistent request 101 may be broadcast on television, the persistent request 101 may enable display of the sporting event on the networked monitor 303. In instances where the sporting event to be monitored by the persistent request 101 may not be broadcast on television, the persistent request 101 may enable the networked monitor 303 to scroll text on the screen regarding the sporting event as extracted by the persistent request 101 from the information source 207. The HWCD 103 may indicate its location to the persistent request 101 utilizing GPS capability or by communicating with the home network 121 via the wireless access point 305 and the Internet 119.

In an embodiment of the invention, the persistent request 101 may enable displaying a list of possible media options on the HWCD 103 for the user to access data on the sporting event being monitored, or the persistent request 101 may enable the appropriate option based on available resources and user preferences. The list may comprise audio or video recordings, live audio or video, and/or text descriptions of the event, for example. The data may be communicated to the HWCD 103 from the home network 121 via the Internet 119 and the wireless access point 305.

As described with respect to FIG. 1, if the user preferences specify a particular format and/or capability in the resources to be used to display and/or output the results of the persistent request 101, and no resources with these formats and/or capabilities are available, the desired data may be communicated to the HWCD 103 at a later time when the resources may be present.

In an embodiment of the invention, the identity of the user of the HWCD 103 may be authenticated to deny unauthorized access to user data. The number of HWCDs is not limited to the HWCD 103 shown in FIG. 3. Accordingly, any number of wireless devices that may be accessed by the user may be utilized for receiving results of the persistent request 101.

Figure 4:
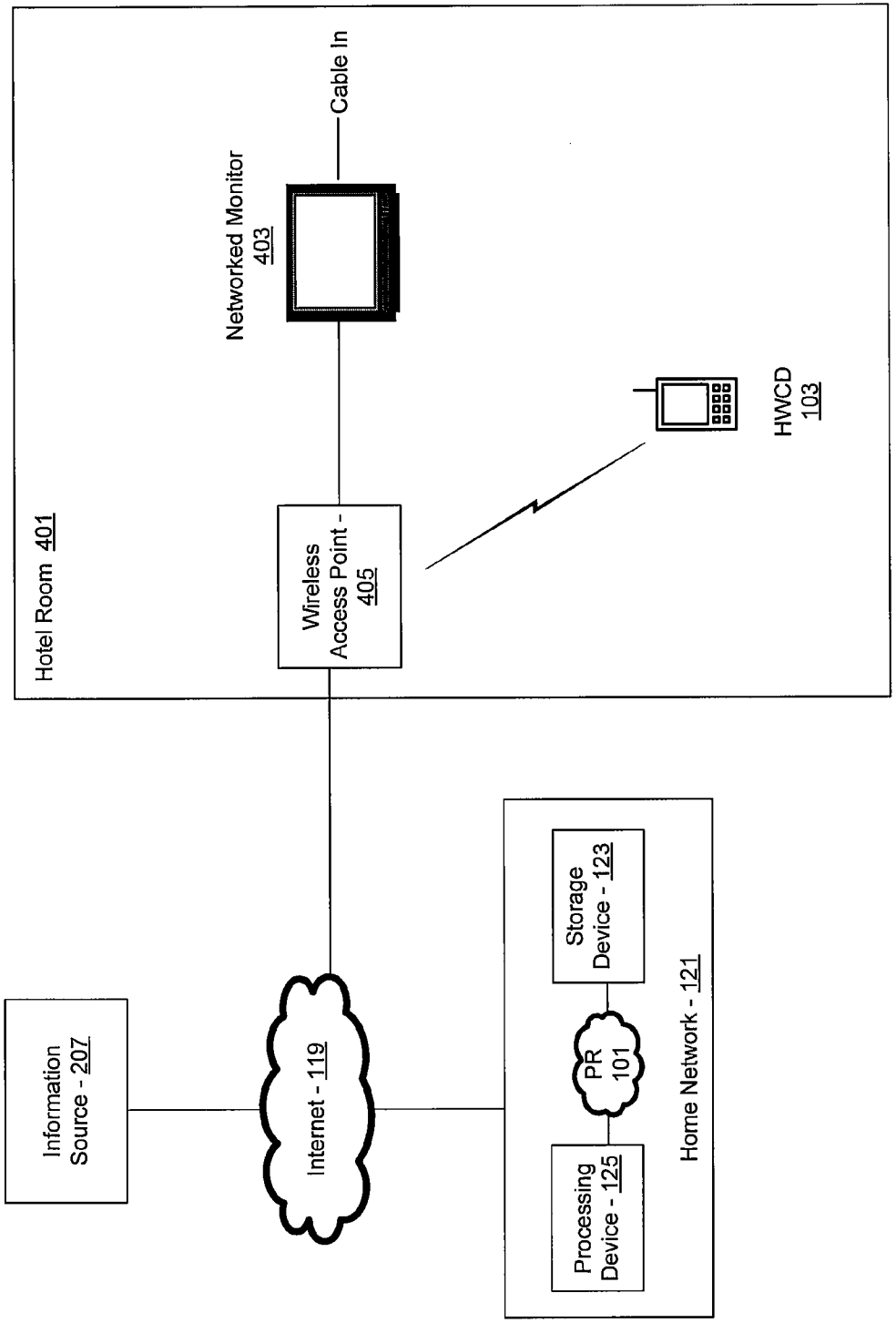
FIG. 4 is an exemplary persistent request hotel room implementation, in accordance with an embodiment of the invention.

FIG. 4 is an exemplary persistent request hotel room implementation, in accordance with an embodiment of the invention. Referring to FIG. 4, there is shown a hotel room 401, the Internet 119, the home network 121 and the information source 207. The hotel room 401 may comprise a wireless access point 405 and a networked monitor 403. The information source 207, the HWCD 103 and the home network 121 may be as described with respect to FIG. 2 and the wireless access point 405 and the networked monitor 403 may be substantially similar to the wireless access point 305 and the networked monitor 303, described with respect to FIG. 3.

In operation, in instances where a persistent request 101 may be generated by the HWCD 103 and communicated to a remote device, such as the processing device 125 and/or the storage device 123, to monitor and store data on a sporting event, as described with respect to FIG. 1, a user of the HWCD 103 may enter the hotel room 401. The HWCD 103 may indicate to the remote device executing the persistent request 101 that it is located in the hotel room 401 via GPS data or by communicating with the persistent request 101 via the wireless access point 405 and the Internet 119. In instances where the sporting event being monitored by the persistent request 101 may be broadcast on television, the persistent request 101 may enable display of the sporting event on the networked monitor 403. In instances where the sporting event being monitored by the persistent request 101 may not be broadcast on television in the broadcast area of the hotel room 401 but broadcast in the broadcast area of the home network 121, the persistent request 101 may enable playback of the sporting event on the networked monitor 403 from video content that may be stored on the storage device 123.

As described with respect to FIG. 1, if the user preferences specify a particular format and/or capability in the resources to be used to display and/or output the results of the persistent request 101, and no resources with these formats and/or capabilities are available, the desired data may be communicated to the HWCD 103 at a later time when the resources may be present.

In an embodiment of the invention, the identity of the user of the HWCD 103 may be authenticated to deny unauthorized access to user data. The number of HWCDs is not limited to the HWCD 103 shown in FIG. 4. Accordingly, any number of wireless devices that may be accessed by the user may be utilized for receiving results of the persistent request 101.

Figure 5:
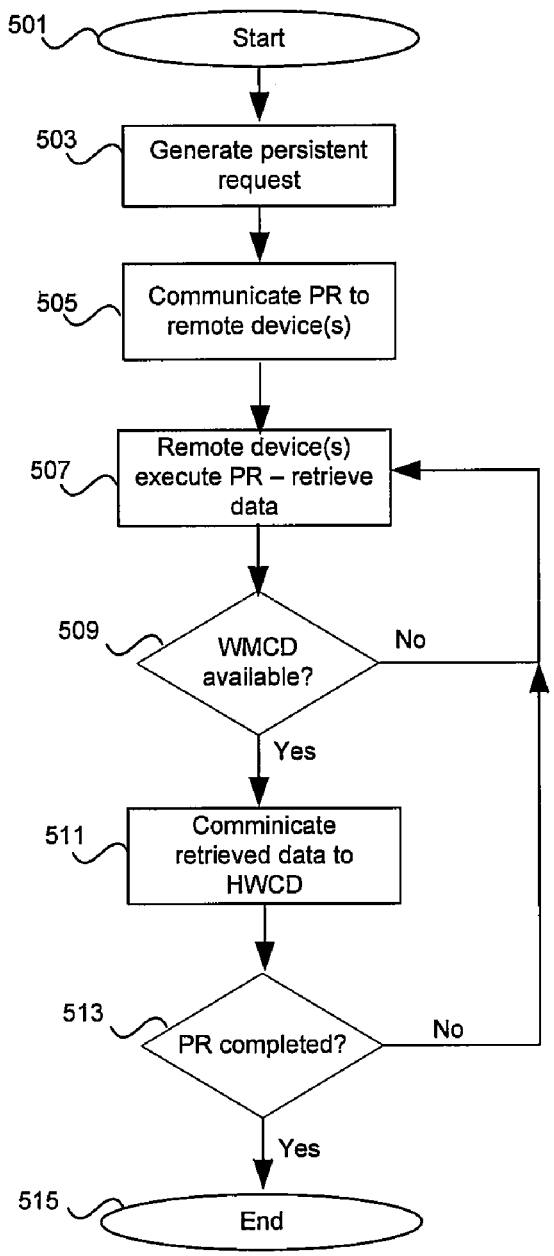
FIG. 5 is a flow diagram illustrating an exemplary persistent request operation, in accordance with an embodiment of the invention.

FIG. 5 is a flow diagram illustrating an exemplary persistent request operation, in accordance with an embodiment of the invention. Referring to FIG. 5, after start step 501, in step 503, the persistent request 101 may be generated, and in step 505 may be communicated to one or more remote devices, such as the processing device 125. In step 507, the processing device 125 may execute the persistent request, which may comprise retrieving information about a particular event, for example. In step 509, if the HWCD 103 may be available, the retrieved data may be communicated to the HWCD 103 in step 511, and if not the process may return to step 507 to continue retrieving data. In step 513, if the persistent request has not completed the task, the process may return to step 507 to continue retrieving data. If in step 513, if the persistent request has completed, the process may continue to end step 515.

In an embodiment of the invention, a method and system are disclosed for generating for a particular user via a handheld wireless communication device (HWCD) 103, a persistent request that may be communicated to one or more remote devices 123 and/or 125 for execution and storage of results corresponding to the persistent request. The stored results may be subsequently received from one or more resources local to the particular user 205, 303, 305, 403 and/or 405. The remote devices 123 and/or 125 may configure local resources 205, 303, 305, 403 and/or 405 to deliver the stored results to the particular user. The stored results may be received by the particular user via the HWCD 103, and the identity of the particular user may be authenticated prior to receiving the stored results via the HWCD 103. The stored results for the particular user may be received via another wireless communication device following user authentication. The remote devices 123 and/or 125 may detect when the particular user may be logged into the network and may discover the local resources 205, 303, 305, 403 and/or 405 based on the detection of the particular user logging into the network. The remote devices 123 and/or 125 may configure the local resources 205, 303, 305, 403 and/or 405 to deliver the stored results to the particular user based on the discovery of local resources. The remote devices 123 and/or 125 may configure the local resources 205, 303, 305, 403 and/or 405 based on preferences associated with the particular user. Preferences associated with the particular user may be stored in one or more devices that may be communicatively coupled to the network, or may be stored in the HWCD 103.

Certain embodiments of the invention may comprise a machine-readable storage having stored thereon, a computer program having at least one code section for communicating information within a network, the at least one code section being executable by a machine for causing the machine to perform one or more of the steps described herein.

Accordingly, aspects of the invention may be realized in hardware, software, firmware or a combination thereof. The invention may be realized in a centralized fashion in at least one computer system or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment of the present invention may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The present invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for communicating in a network, the method comprising:
   generating for a particular user via a handheld wireless communication device, a persistent request that is communicated to one or more remote devices for execution and storage of results over a period of time, said results corresponding to said persistent request; and
   subsequently receiving said stored results corresponding to said persistent request, by one or more resources that are separate from said handheld wireless communication device and that are local to said particular user, for consumption by said one or more resources local to said particular user, wherein said persistent request configures said one or more local resources to receive said stored results from said one or more remote devices for said particular user
   wherein said one or more remote devices detects when said particular user is logged into the network and discovers said one or more local resources based on said detection of said particular user logging into the network.

2. The method according to claim 1, comprising authenticating an identity of said particular user prior to said receiving said stored results by said one or more resources local to said particular user.

3. The method according to claim 1, comprising receiving said stored results for said particular user via another wireless communication device.

4. The method according to claim 3, comprising authenticating an identity of said particular user prior to said receiving said stored results by said one or more resources local to said particular user.

5. A method for communicating in a network, the method comprising:
   generating for a particular user via a handheld wireless communication device, a persistent request that is communicated to one or more remote devices for execution and storage of results corresponding to said persistent request over a period of time; and
   subsequently receiving said stored results corresponding to said persistent request, by one or more resources that are separate from said handheld wireless communication device and that are local to said particular user, for consumption by said one or more resources local to said particular user, wherein said persistent request configures said one or more local resources to receive said stored results from said one or more remote devices for said particular user and to deliver said stored results to said one or more resources local to said particular user based on discovery of said one or more local resources.

6. The method according to claim 5, wherein said persistent request configures said one or more local resources based on preferences associated with said particular user.

7. The method according to claim 6, wherein said preferences associated with said particular user are stored in one or more devices that are communicatively coupled to said network.

8. The method according to claim 6, wherein said preferences associated with said particular user are stored in said handheld wireless communication device.

9. The method according to claim 5, comprising subsequently receiving said stored results when said stored results become available.

10. A system for communicating in a network, the system comprising:
    one or more processors within a handheld wireless communication device that generates for a particular user, a persistent request that is communicated to one or more remote devices for execution and storage of results corresponding to said persistent request over a period of time,
    wherein said persistent request enables subsequently receiving of said stored results corresponding to said persistent request, by one or more resources that are separate from said handheld wireless communication device and that are local to said particular user, for consumption by said one or more resources local to said particular user,
    wherein said persistent request configures said one or more local resources to receive said stored results for said particular user,
    wherein said one or more processors enables authentication of an identity of said particular user prior to said receiving said stored results by said one or more resources local to said particular user via said handheld wireless communication device.

11. The system according to claim 10, wherein said stored results for said particular user are received via another wireless communication device.

12. The system according to claim 11, wherein an identity of said particular user is authenticated prior to said receiving said stored results by said one or more resources local to said particular user.

13. The system according to claim 10, wherein said one or more remote devices detects when said particular user is logged into the network.

14. The system according to claim 13, wherein said one or more remote devices discovers said one or more local resources based on said detection of said particular user logging into the network.

15. The system according to claim 14, wherein said persistent request configures said one or more remote devices to deliver said stored results to said one or more resources local to said particular user based on said discovery of said one or more local resources.

16. The system according to claim 15, wherein said persistent request configures said one or more local resources based on preferences associated with said particular user.

17. The system according to claim 16, wherein said preferences associated with said particular user are stored in one or more devices that are communicatively coupled to said network.

18. The system according to claim 16, wherein said preferences associated with said particular user are stored in said handheld wireless communication device.

* * * * *